United States Patent [19]
Blazey et al.

[11] Patent Number: 5,064,277
[45] Date of Patent: Nov. 12, 1991

[54] OPERATION OF A LIGHT MODULATOR OF THE PLANAR ELECTRODE TYPE

[75] Inventors: Richard N. Blazey, Penfield; David M. Pultorak, Rochester, both of N.Y.

[73] Assignee: Eastman Kodak Company, Rochester, N.Y.

[21] Appl. No.: 646,116

[22] Filed: Jan. 28, 1991

[51] Int. Cl.$^5$ ............... G02F 1/05; G02F 1/13; G02B 6/10
[52] U.S. Cl. ................... 359/276; 359/245; 359/85; 385/2
[58] Field of Search ............ 350/356, 355, 332, 96.14

[56] References Cited

U.S. PATENT DOCUMENTS

| | | | |
|---|---|---|---|
| 3,653,745 | 4/1972 | Mao | 350/332 |
| 3,701,249 | 10/1972 | Bergey et al. | 350/338 |
| 3,744,049 | 7/1973 | Luce | 350/332 |
| 3,806,897 | 4/1974 | Buchan et al. | 350/393 |
| 3,855,783 | 12/1974 | Luce | 368/84 |
| 4,369,457 | 1/1983 | Sprague | 350/356 |
| 4,545,078 | 10/1985 | Wiedeburg | 350/96.14 |
| 4,553,810 | 11/1985 | Alferness et al. | 350/96.14 |
| 4,561,718 | 12/1985 | Nelson | 350/96.14 |
| 4,631,551 | 12/1986 | Vergona | 346/108 |
| 4,667,256 | 5/1987 | Vergona | 350/356 |
| 4,706,103 | 11/1987 | Ranganath | 350/96.14 |
| 4,786,858 | 11/1988 | Haas et al. | 350/356 |

FOREIGN PATENT DOCUMENTS

| | | | |
|---|---|---|---|
| 0082223 | 5/1983 | Japan | 350/356 |
| 0246721 | 11/1986 | Japan | 350/356 |
| 0275722 | 12/1986 | Japan | 350/356 |
| 0008130 | 1/1987 | Japan | 350/356 |

OTHER PUBLICATIONS

A. E. Kapenieks et al., "The Mechanism of Applied--Field-Induced Remanent Birefringence in Transparent Ferroelectric PLZT Ceramics"; Ferroelectrics Letter; 1982 vol. 44, pp. 189-196.

*Primary Examiner*—Eugene R. LaRoche
*Assistant Examiner*—Evelyn A. Lester
*Attorney, Agent, or Firm*—Dennis P. Monteith

[57] ABSTRACT

An electro-optic light modulator of the type including a body of an electro-optic material having opposed surfaces and a pair of planar conductive electrodes on at least one of the surfaces of the body. Polarity-reversing drive circuitry applies a voltage across the electrodes, the polarity of the voltage being reversed at a frequency of about 1 Hz or less with polarity reversal occurring either when the light modulator is turned off or when there is an insignificant voltage drop across the electrodes. This low frequency of the reversal of the polarity of the voltage substantially eliminates drift of the voltage-transmissivity of the modulator, lowers leakage, and reduces damage to the electrodes during a given period of time of operation.

10 Claims, 7 Drawing Sheets

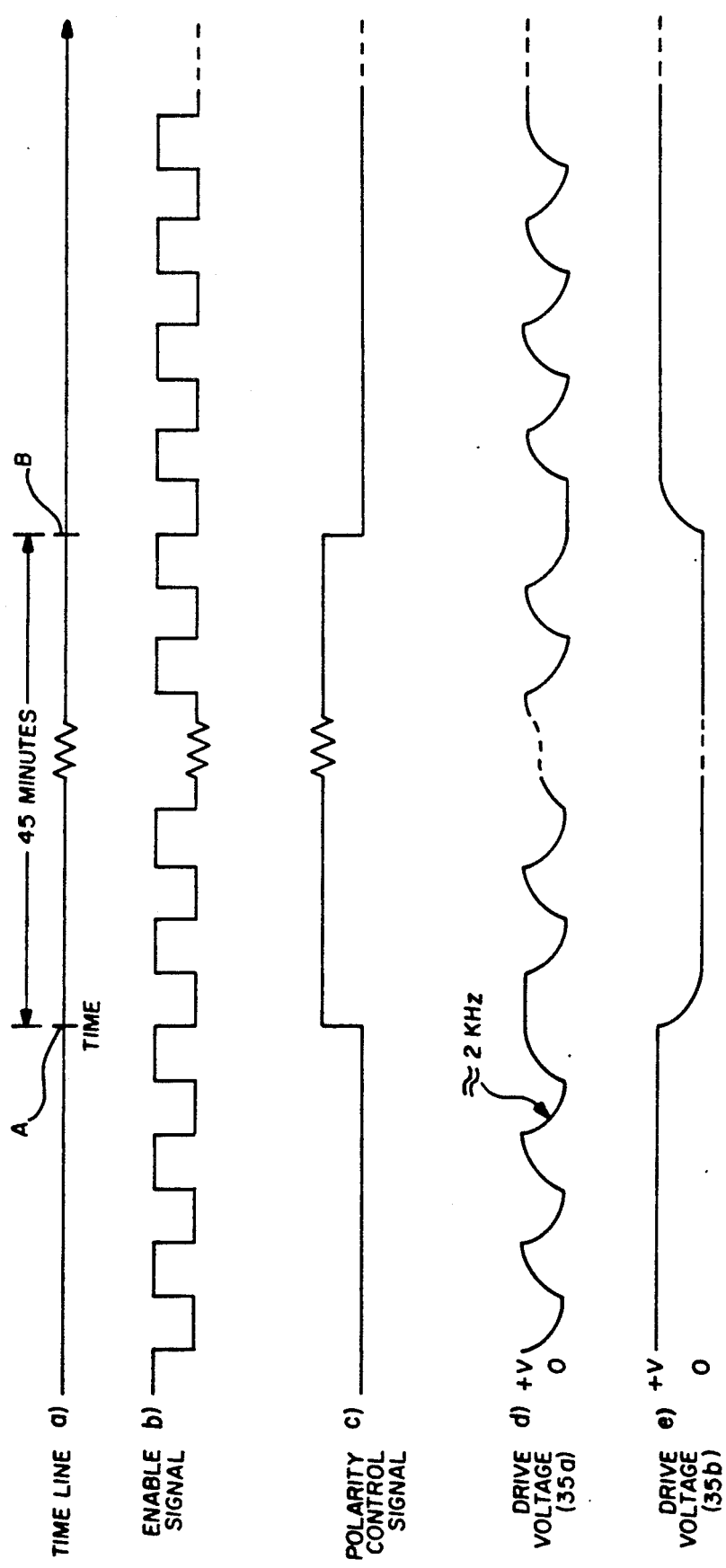
FIG. IB

DAMAGE TO BOTTOM ELECTRODES

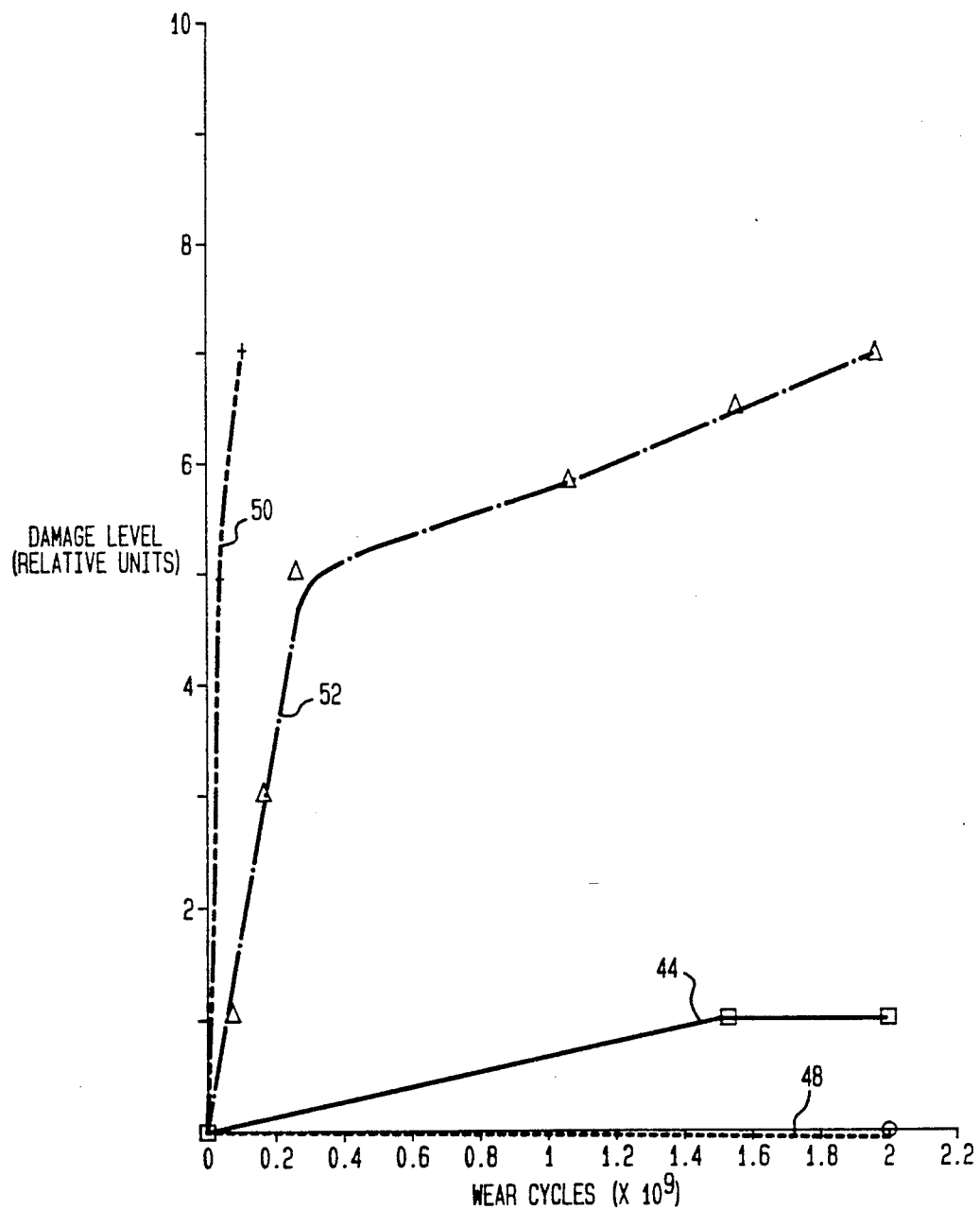

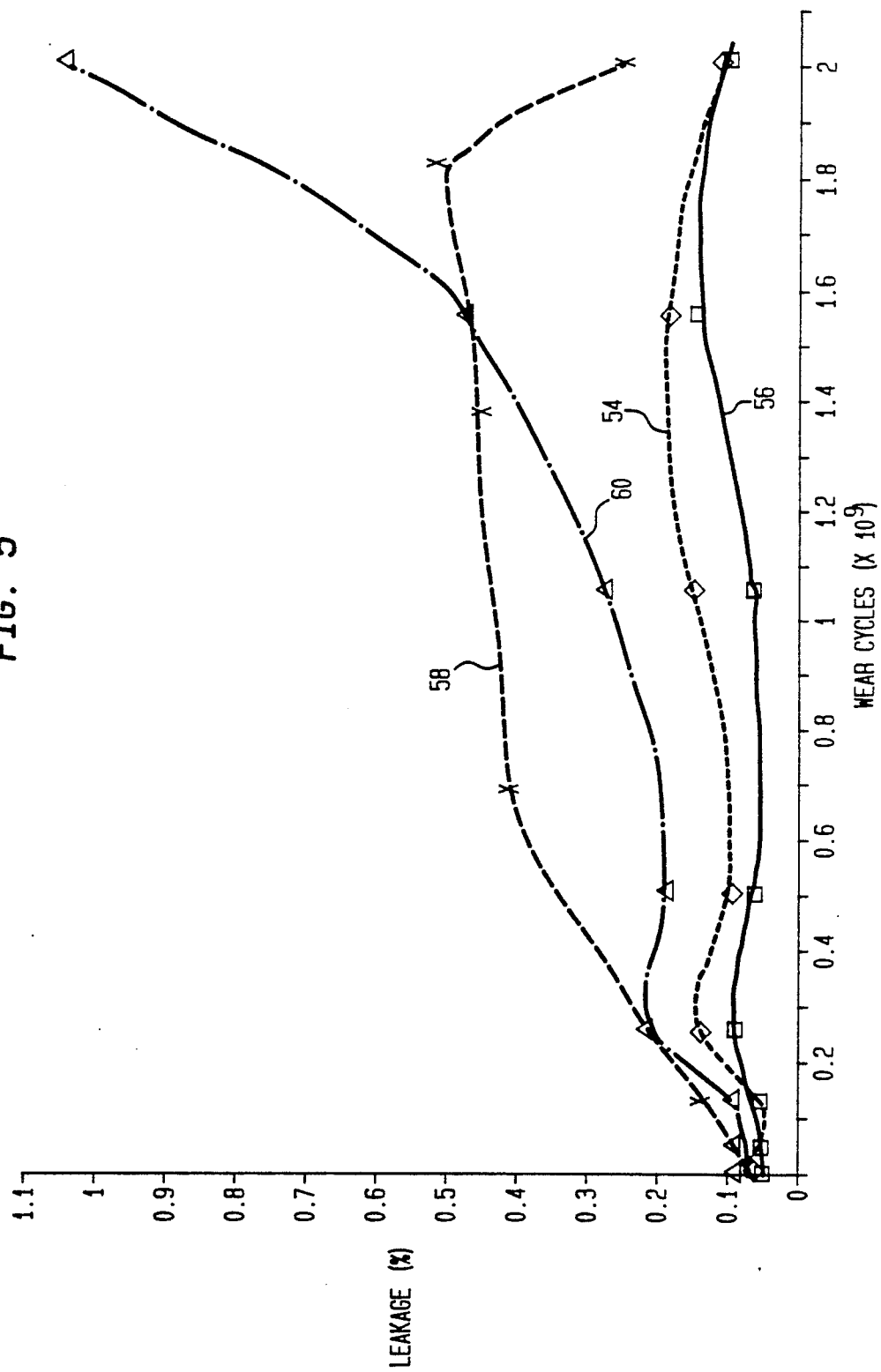

OPERATION OF A LIGHT MODULATOR OF THE PLANAR ELECTRODE TYPE

BACKGROUND OF THE INVENTION

1. Field of the Invention

The present invention relates to the operation of a light modulator of the planar electrode type, and, more particularly, to a polarity reversing drive for a light modulator of the planar electrode type.

2. Descriotion Of the Related Art

Electro-optic materials are those whose optical properties change in accordance with the strength of an electric field established within them. These materials make possible an electrically controlled "electro-optic modulator". As used herein, the term "modulator" includes a device which changes the intensity of light in response to an applied electric signal. An "electro-optic modulator" includes a member formed of electro-optic material which receives plane polarized (linear) light and which changes the state of polarization of such light in response to an established electric field. An analyzer receives light from the member and blocks that light whose plane of polarization has not changed (no established electric field) while transmitting light when its plane of polarization has been changed by an established electric field. By changing the electric field in the electro-optic member, light which passes through the analyzer is modulated.

One example of an electro-optic material used in modulators is lanthanum-doped lead zirconate titanate (PLZT). Although PLZT is a preferred electro-optic material, it will be recognized by those skilled in the art that other electro-optic materials can also be used to change the polarization of light.

It is known that the voltage-to-transmissivity transfer characteristic of an electro-optic modulator can drift or change with time under constant illumination. This drift is generally believed to be caused by a "space charge"- comprised of photogenerated or injected electrons or holes in the electro-optic material of the light modulator. The induced charges, (i.e., the space charge) drift under the influence of voltage applied between the electrodes attached to the electro-optic material. Thus, the net electric field between the electrodes varies in accordance with the strength and polarity of the space charge, and thereby causes a change in the voltage-transmissivity transfer characteristic of the light modulator.

Apparatus is known in the art for reducing the adverse effects of induced space charge. For example, U.S. Pat. No. 4,631,551 (A. B. Vergona) issued Dec. 23, 1986, entitled "Color Imaging Apparatus Using Electro-Optic Modulators" and U.S. Pat. No. 4,667,256 (A. B. Vergona) issued May 19, 1987, entitled "Circuit For Electro-Optic Modulators", both of which are assigned to the assignee of this invention, disclose respective feedback networks for controlling a light modulator with an applied unidirectional voltage.

An alternative approach is to reverse the polarity of the applied electric field at regular intervals. By way of example, U.S. Pat. No. 4,369,457 (R. A. Sprague), issued Jan. 18, 1983, entitled "Reverse Polarity Differential Encoding For Fringe Field Responsive Electro-Optic Line Printers"discloses a line printer having polarity-reversing drive voltage circuitry for inhibiting charge carrier accumulation in a light modulator. Drive voltage is switched at the line scan rate of the printer, which can be expected to be on the order of several cycles per second (Hz) or more for a modern day high-speed printer.

Through experimentation we have confirmed that reversing the polarity of the applied electric field at a rate of several hertz or more eliminates the aforementioned voltage/transmissivity drift problem for a light modulator of the type having electrodes of the so-called bulk, in-depth or channel type, i.e., electro-optic material is sandwiched between corresponding electrode pairs. However, with regard to an optical modulator having planar electrodes (i.e., corresponding electrode pairs on a common surface of the electro-optic material) we have found that operating the modulator by reversing the polarity of the applied voltage at a comparable rate (i.e., several hertz or more) provided an unsatisfactory solution to the "drift problem".

In an article entitled, "The Mechanism of Applied-Field-Induced Remanent Birefringence In Transparent Ferroelectric PLZT Ceramics" by A.E. Kapenieks et al., published in *Ferroelectrics Letter*, 1982, Vol. 44, pages 189-196, it is reported in the case of an optical modulator having planar electrodes that a localized intense electric field occurs near planar electrode edges with injected carriers being trapped in the electro-optic material near the cathode electrode. It is further reported that this phenomenon has a dual disadvantage in that both the speed and the contrast ratio achievable with the light modulator are reduced.

Kapenieks et al. offer as possible solutions to this problem (1) thoroughly cleaning the surface of the electro-optic material with ethanol and fabricating the electrodes so that their edges are sharp, or (2) employing bulk electrodes instead of planar electrodes. The former solution would require at least one additional processing step whereas the latter would restrict a designer to a light modulator of the type in which electro-optic material is sandwiched between corresponding electrode pairs.

SUMMARY OF THE INVENTION

The present invention is directed to a method of operating an electro-optic light modulator having planar electrodes by reversing the polarity of an applied electric field at a very low frequency. A polarity-reversal frequency of about one hertz or less was found to be preferred, with polarity reversal occurring when the light modulator is turned off or when there is an insignificant voltage drop across the electrodes. Contrary to the general and specific teachings of the prior art, this polarity reversal rate is believed to be at least one order of magnitude less than any rate heretofore utilized.

Operation of a light modulator in this manner offers the advantage of substantially eliminating drift of the voltage-transmissivity characteristics of the modulator and of reducing damage to the electrodes. Comparing the performance of light modulators operated at "field-reversing rates" contemplated by the present invention with the performance of light modulators of the planar electrode type operated at "field-reversing rates"employed in the prior art, we have found that the latter suffer from electrode damage that occurs 10 to 30 times earlier than the former.

The electro-optic modulator comprises a body of an electro-optic material having a pair of opposed surfaces and a pair of conductive electrodes on at least one of the surfaces. The electrodes are connected to means for applying a voltage thereacross and to reverse the polarity of the voltage at a frequency which distributes electrical charges injected into the electro-optic material substantially uniformly throughout the material. This substantially eliminates the drift of the voltage-transmissivity characteristics of the modulator, lowers leakage, and reduces damage to the electrodes during a given period of time of operation.

Viewed from one aspect, the present invention is directed to an electro-optic light modulator. The electro-optic light modulator comprises a body of an electro-optic material having a pair of opposed surfaces. A pair of conductive electrodes are on at least one of the surfaces of the body with means connected to said electrodes for applying a voltage thereacross. The electro-optic light modulator further comprises means for reversing the polarity of the voltage applied to the electrodes at a frequency low enough to substantially uniformly distribute electrical charges injected into the electro-optic material throughout the electro-optic material and thereby substantially eliminate drift of the voltage-transmissivity of the light modulator and reduce damage to the electrodes.

Viewed from another aspect, the present invention is directed to a method of operating an electro-optic light modulator which comprises a body of an electro-optic material having opposed surfaces and a pair of conductive electrodes on at least one of said surfaces. The method comprises the steps of applying a voltage between said electrodes, and reversing the polarity of the voltage at a frequency low enough to substantially uniformly distribute electrical charges injected into the electro-optic material throughout the electro-optic material and thereby substantially eliminate drift of the voltage-transmissivity of the light modulator and reduce damage to the electrodes.

The invention will be better understood from the following more detailed description taken with the accompanying drawings.

BRIEF DESCRIPTION OF THE DRAWINGS

FIG. 1B comprises a series of waveforms useful in understanding the operation of the circuitry of FIG. 1A;

FIGS. 3 and 4 are graphs showing the wear cycles vs. damage level for the bottom and top electrodes of a group of electro-optic light modulalors operated at different rates of reversing the polarity of an applied electric field; and FIG. 5 is a graph showing the leakage rate vs. wear cycles for a group of electro-optic modulators operated at different rates of reversing the polarity of an applied electric field.

DETAILED DESCRIPTION OF A PREFERRED EMBODIMENT

Figure 1:
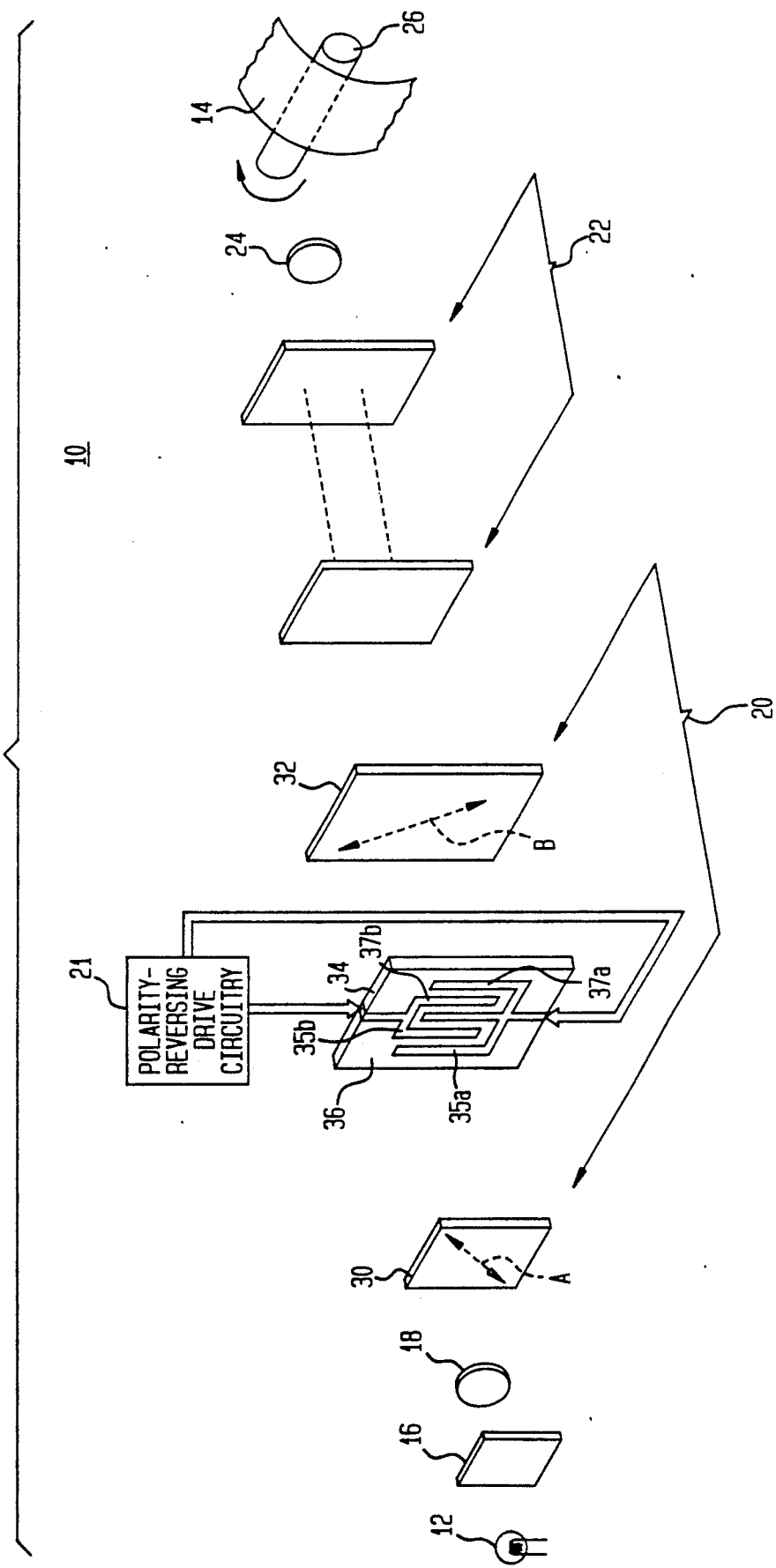
FIG. 1 is a schematic illustration in a simplified condition of a microfilmer apparatus with which the present invention can be used.

Referring to FIG. 1, there is schematically shown in unfolded form in a simplified condition a microfilm apparatus 10 which includes an electro-optic light modulator 20 which can be operated in accordance with the present invention.

The microfilm apparatus 10 comprises a panchromatic light source 12 (e.g., such as a tungsten-halogen lamp), a heat glass 16, a lens 18, the electro-optic light modulator 20, a group of mirrors 22, a lens 24, a microfilm 14, and a film holder 26. Light source 12 provides light for exposing the microfilm 14. The heat glass 16 serves to absorb infrared (IR) radiation emitted by the light source 12 to keep optical components of the apparatus 10 from overheating. The lens 18 functions to image light from the light source 12 to fill the Pupil of the lens 24. The light modulator 20 operates as an electrical shutter in accordance with the strength of a voltage applied by polarity-reversing drive circuitry 21 coupled thereto. The mirrors 22 serve to cooperatively direct light transmitted through the modulator 20 around various mechanical obstructions (not shown) in the microfilmer apparatus 10. The lens 24, which is interposed between the mirrors 24 and the film holder 26, collects light at the output of the mirrors 22 and focuses this light as a small spot on the microfilm 14. Suitable means, such as a stepper motor (not shown), functions to translate the film in a sidewise direction, transverse to the longitudinal direction.

The light modulator 20 comprises a first linear polarizer 30, a second linear polarizer 32, and a body of electro-optic material 34. The polarizer 30 which, in response to incident light, serves to transmit light that is plane-polarized in a particular azimuth direction, denoted by the double-headed phantom arrow A. The second linear polarizer 32, on the other hand, functions as an analyzer by transmitting light plane polarized in an azimuth direction, denoted by the double-headed phantom arrow B, that is a particular amount, preferably 90°, from the plane polarization of the polarizer 30. The body of electro-optic material 34, which is preferably lanthanum-doped lead zirconate titanate (PLZT), is sandwiched between the polarizers 30 and 32. As is known in the art, PLZT (and other equivalent electro-optic materials) has a birefringence characteristic that varies in proportion to the amplitude, but not its direction, of an applied voltage. To that end, the light modulator 20, which is of the planar electrode type, has a corresponding electrode pair in a comb-like configuration with one electrode 35a and a second electrode 35b attached to a common surface 36 of the electro-optic material 34 with the teeth 37a and 37b of the electrodes 35a and 35b, respectively, being interdigitated. The electrodes 35a and 35b can be deposited on the surface 36 of the material 34 by any of several means well known in the art, such as by vacuum deposition or sputtering of metals followed by a photolithographic process to define the shape of the electrodes 35a and 35b. While the electrodes 35a and 35b may be formed of any suitable electrically conductive material, metallic compounds, such as chrome-gold and tantalum-gold are particularly effective. Electro-optic material 34 has an opposing surface to surface 36 which is not shown in FIG. 1. Optionally, interdigitated electrodes 35a and 35b can be formed on this opposing surface in addition to being formed on the surface 36.

The voltage applied across the electrodes 35a and 35b establishes an electric field in the electro-optic material 34 in a direction determined by the polarity of the applied voltage. As is known in the art, the strength of this electric field controls the rotation of the plane of polarization of light transmitted through the electro-optic material 34. When the strength of the electric field established in the electro-optic material 34 causes the plane of polarization of incident light to rotate 90°, then the polarizer 32 passes a maximum intensity of incident light. A particular advantage of the modulator 20 is that the comb-like electrode configuration has a small inter-electrode spacing, thereby lowering the amplitude of the applied voltage that is necessary to produce 90° rotation of the plane of polarization of incident light.

It is known in the art that the voltage-to-transmissivity characteristic of a light modulator can change with time. Leakage (light transmission with no applied field) can become excessive. The change in voltage-to-transmissivity characteristic has been attributed to trapped carriers accumulating (e.g., space charge build-up) in the electro-optic material of a light modulator. U.S. Pat. No. 4,369,457, referred to heretofore, seeks to prevent space charge build-up in a light modulator operated in a total internal reflection (TIR) mode by reversing the polarity of an applied electric field at the line scan rate of a line printer.

We have found that the most important parameters affecting the operational life of a light modulator of the planar electrode type are (1) the polarity reversal rate of the applied electric field, and (2) the fact that polarity reversal should occur either when the light modulator is turned OFF completely, or when there is an insignificant voltage drop across the electrodes. By insignificant drop, we mean a voltage that is no more than approximately ten percent (10%) of the half-wave voltage applied across the electrodes. As far as the polarity reversal rate is concerned, we have found that the light modulator should be operated at about 1 Hz or less. Circuitry for reversing the polarity of the drive voltage may take any of a variety of forms. U.S. Pat. Nos. 3,653,745; 3,701,249; 3,744,049; and 3,855,783, the disclosures of which are incorporated herein by reference, disclose exemplary polarity-reversing drive circuits.

Figure 1A:
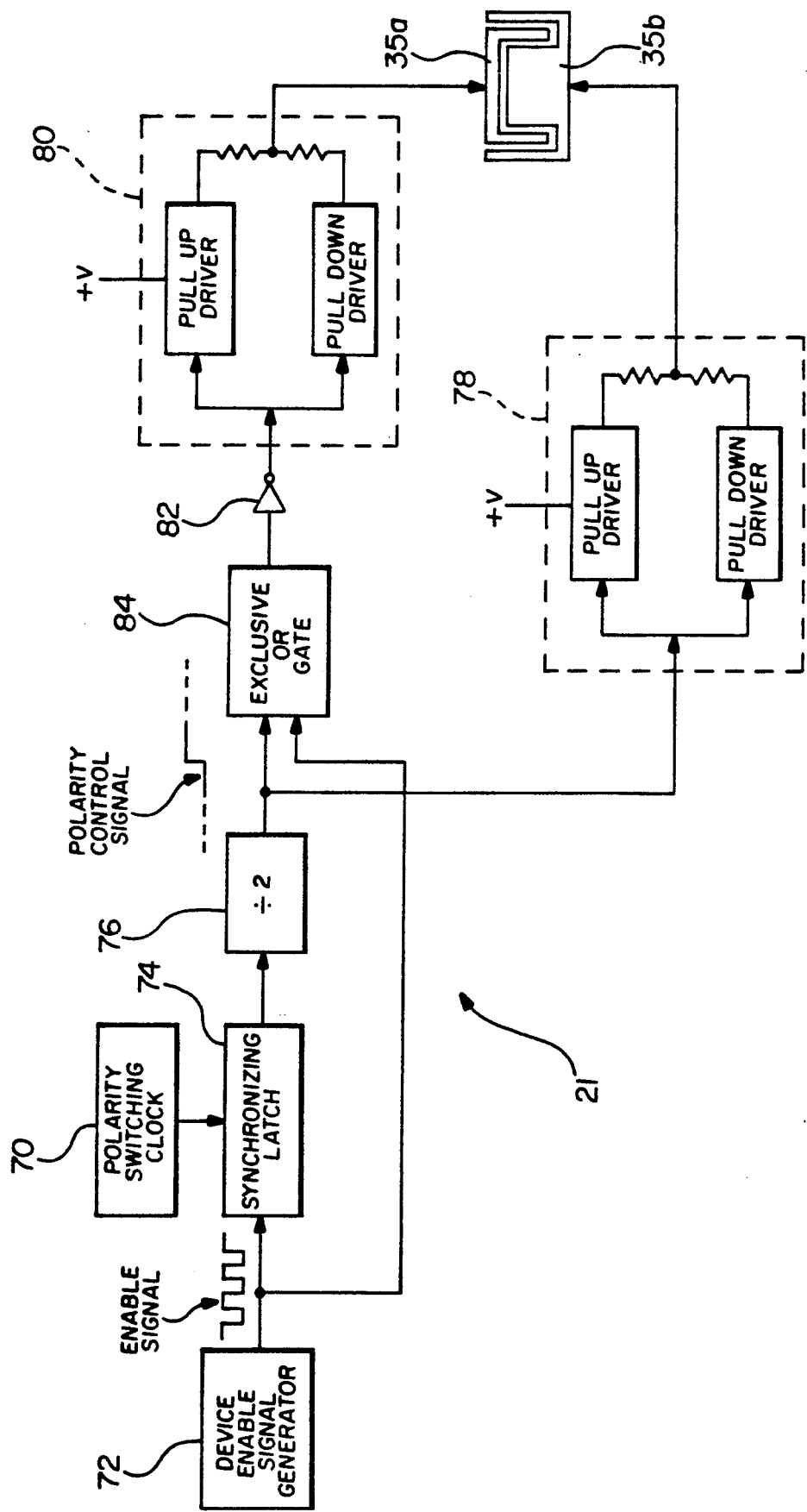
FIG. 1A is a block diagram of a preferred embodiment of circuitry in accordance with the present invention.

FIG. 1A is a block diagram of a presently preferred embodiment of polarity-reversing drive circuitry 21 for the light modulator 20 of FIG. 1. A clock 70 serves to provide a pulsed reference signal. The period of each full cycle of the reference signal corresponds to the interval during which the polarity of the voltage applied across the electrodes 35a, 35b is fixed. In the next full cycle, the voltage polarity is fixed in the opposite direction. In a presently preferred embodiment, polarity reversal occurs every 45 minutes. Accordingly, the period of each full cycle of the reference signal is 45 minutes. From the standpoint of pulse rate, the clock signal has a frequency of approximately 0.00037 Hz, each half cycle of the clock signal having a period of 22.5 minutes.

A device-enable signal generator 72 provides a relatively high frequency (approximately 2 KHz) bi-level ENABLE signal for driving the modulator 20 on and off.

A synchronizing latch 74 serves as a sample and hold circuit and, in doing so, produces a latched output corresponding to input received from the clock 70 and the device enable signal generator 72. In its sample and hold operation, the latch 74 functions to update its output, in accordance with the input received from the clock 70, only when the bi-level ENABLE signal received from the signal generator 72 is going from a high condition to a low condition. In doing so, the synchronizing latch 74 produces an output that effectively mimics the reference signal produced by the clock 70.

A divide-by-two circuit 76 serves to control the polarity of the voltage applied to the electrodes 35a, 35b. For that purpose, the circuit 76 produces a bi-level POLARITY CONTROL signal, one level causing a polarity in one direction and the other level a polarity in the opposite direction. So that polarity occurs every 45 minutes, the circuit 76 divides the frequency of the reference signal produced by the clock 70 by two.

Voltage driver circuitry 78 serves to control whether a relatively high voltage V (approximately 100 volts) or ground potential is applied to the electrode 35b. In doing so, circuitry 78 operates as an inverter and applies the voltage V to the electrode 35b when the POLARITY CONTROL signal at the output of the divide-by-two circuit 76 is low, and applies ground potential to the electrode 35b when the POLARITY CONTROL signal is high.

Circuitry 80 serves to apply drive voltage to the electrode 35a. In doing so, voltage driver circuitry 80, like circuitry 78, operates as an inverter in response to a bi-level input signal. The driver circuitry 80, however, receives its bi-level input from an inverter 82 serially connected to a dual-input exclusive OR gate 84.

As shown in FIG. 1A, one input of the exclusive OR gate 84 receives the POLARITY CONTROL signal from the divide-by-two circuit 76 and the second input of the gate receives the 2 KHz ENABLE signal from the generator 72. By virtue of the operation of the exclusive OR gate 84 and the inverting operation provided by the inverter 82, the input to the driver circuitry 80 consists of a 2 KHz bi-level signal. This 2 KHz input signal is 180 degrees out of phase with the ENABLE signal from the generator 72 when the POLARITY CONTROL signal from the circuit 76 is low, and is in phase with the ENABLE signal when the POLARITY CONTROL signal is high. Due to inherent capacitance, the voltage driver circuitry 80, in response to its 2 KHz input signal, applies a voltage to the electrode 35a that rises exponentially from ground potential to the voltage V when the 2 KHz input is high and falls exponentially from the maximum voltage V to ground when the 2 KHz input is low.

In operation, assume that initially the output of the clock 70 is low. In this case, the latch 74 latches its output at a low level in response to each negative-going transition of the 2 KHz ENABLE signal. With the initial operation of the clock 70 at a low level, the output of the circuit 76 similarly assumes a low condition, shown by the POLARITY CONTROL signal of FIG. 1B.

With the POLARITY CONTROL signal low, the voltage driver circuitry 78 applies the voltage V to the electrode 35b, as shown in FIG. 1B. The voltage driver circuitry 80, on the other hand, applies a voltage to the electrode 35a that rises exponentially to the voltage V when the 2 KHz ENABLE signal is high, and falls exponentially to ground potential when the ENABLE signal is low. In this situation, the polarity of the electric field across the modulator 20 is positive from the electrode 35b to the electrode 35a. Immediately prior to each negative-going transition of the ENABLE signal, however, the modulator 20 is momentarily OFF as the voltage V is applied to both electrodes 35a, 35b.

Eventually, the POLARITY CONTROL signal assumes a high condition in synchronism with one of the negative-going transitions of the ENABLE signal. This is shown in FIG. 1B as occurring at time A on the timeline (a) wherein both the electrodes 35a, 35b are at the potential V just prior to A.

When the POLARITY CONTROL signal assumes its high condition, the voltage driver circuitry 78 switches, thereby applying ground potential to the electrode 35b. The voltage driver circuitry 80, on the other hand, now produces a 2 KHz signal which rises exponentially to the potential V when the ENABLE signal is low and which falls exponentially to ground potential when the ENABLE signal is high. In this situation, the polarity of the electric field across the modulator is reversed, and is now positive from the electrode 35a to the electrode 35b. With the reversal of the polarity at time A, the modulator 20 turns ON.

With the electrode 35b at ground potential, the modulator 20 is momentarily OFF immediately prior to each negative-going transition of the the electrode 35a at these times. After 45 minutes, the POLARITY CONTROL signal again assumes its low condition during one of the negative-going transitions of the ENABLE signal, and the polarity of the voltage across the electrodes 35a, 35b reverses at that time. This is shown in the timeline of FIG. 1B as occurring at the time B. Just prior to the time B, i.e., prior to a negative-going transition of the ENABLE signal, the modulator 20 is, of course, momentarily OFF. With the reversal of the polarity of the drive voltage, the modulator 20 turns ON.

At these low frequencies any electrical charges injected into the electro-optic material are substantially uniformly distributed therein and do not concentrate near the injecting electrodes as is believed to be the case when the frequency of the reversal rate is higher. This lower frequency results in a lower incidence of damage to the electrodes, lower leakage and improved transmissivity. As evidenced by the circuitry of FIG. 1A, we have found that improved performance exists with the frequency of polarity reversal as low as 0.00037 Hz, i.e., polarity reversal occurs once every 45 minutes.

Figure 2:
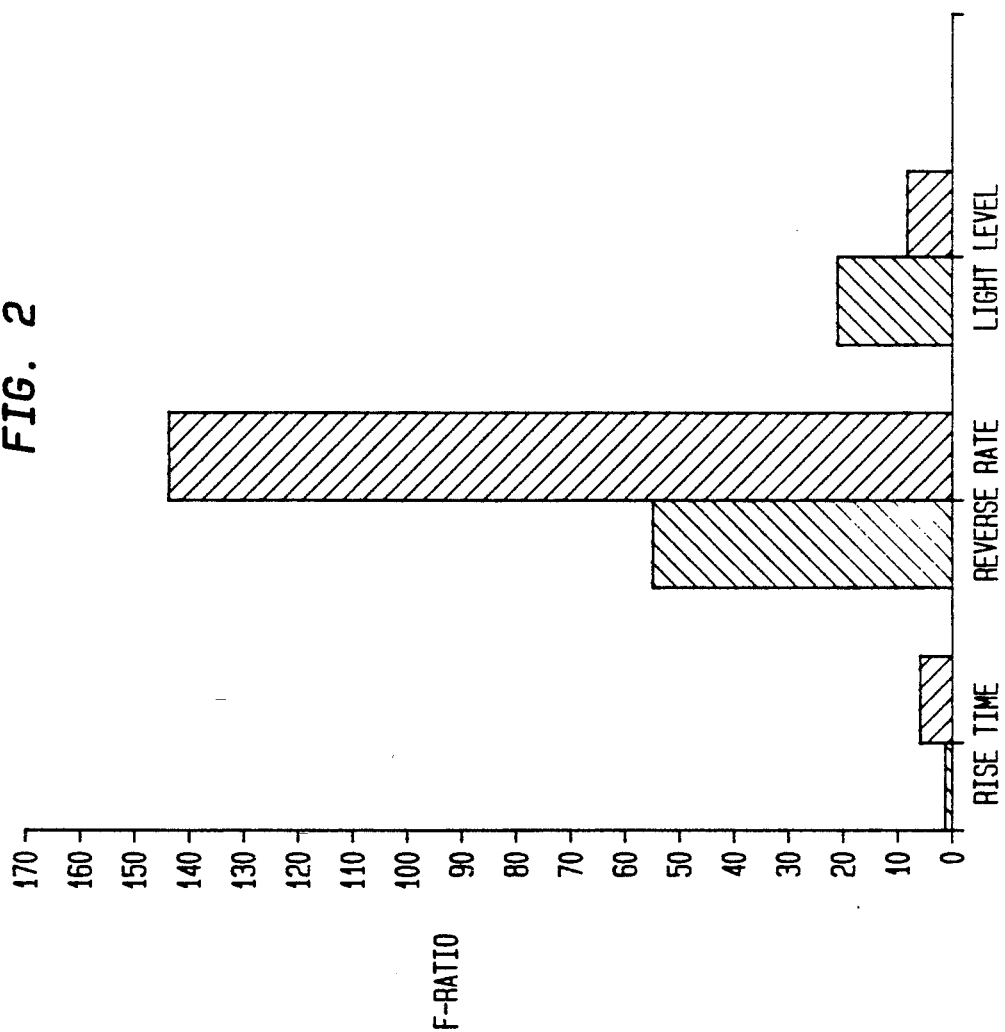
FIG. 2 is a chart showing the effect on transmission and leakage of the three factors, rise time, flip frequency and light level, using the F-ratio as the ordinate to indicate the statistical significance of these factors.

Those skilled in the art should not be misled by these low frequencies into believing that polarity reversal can be ignored or is unimportant. When polarity reversal does not occur, we found in all cases that light modulator performance is degraded. More specifically, we investigated the affect that three parameters, i.e., rise time, polarity reversal rate, and light level, have on electrode erosion, modulator transmissivity and leakage. FIG. 2 is a graph illustrating our findings by means of the so-called F-ratio statistic, which measures the statistical significance of each parameter on electrode erosion, transmissivity and leakage. The graph shows three sets of vertical bars. Starting from the left side of the graph, the first set is for rise time, the second set is for polarity reversal rate and the third set for light level. In each set of bars the bar on the left is for transmissivity and the bar on the right is for leakage. The results for this graph were taken from the testing of a group of light modulators using PLZT electro-optic material and having planar electrodes.

Rise time is defined as the time required for an applied voltage pulse to rise to 63% of its peak value. The light modulators were driven by voltage pulses with fast rise times (55 microseconds) and slow rise times (110 microseconds). In general, light modulators driven by voltage pulses with the fast rise time showed slightly more damage (electrode erosion, transmissivity drift, and excessive leakage) than those modulators subjected to voltage pulses with long rise times. However, it can be seen from the low F-ratio for rise time in FIG. 2, that rise time has little effect on transmission and leakage.

Electrode erosion is further retarded when polarity reversal is synchronized with the turning on/turning off of the electro-optic device. In the presently preferred embodiment of FIG. 1A, the change in polarity across the electrodes from one direction, i.e., plus (+) to minus (−), to the opposite direction, i.e., −to +, occurs either when the device is off or when there is an insignificant voltage drop across the electrodes. By insignificant drop, we mean a voltage that is no more than approximately ten percent (10%) of the half-wave voltage normally applied across the electrodes.

It is known in the art that a light modulator employing PLZT electro-optic material suffers from photogenerated space charge. We found, however, that a high light level is associated with increased transmissivity, but, as shown in FIG. 2, has an insignificant affect on leakage. The light modulators tested were subjected to light intensity levels of 35,000 microwatts/cm$^2$ and 55,000 microwatt/cm$^2$. However, the low F-ratio for variations in light level indicate that this factor is also insignificant with regard to transmissivity and leakage.

Figure 3:
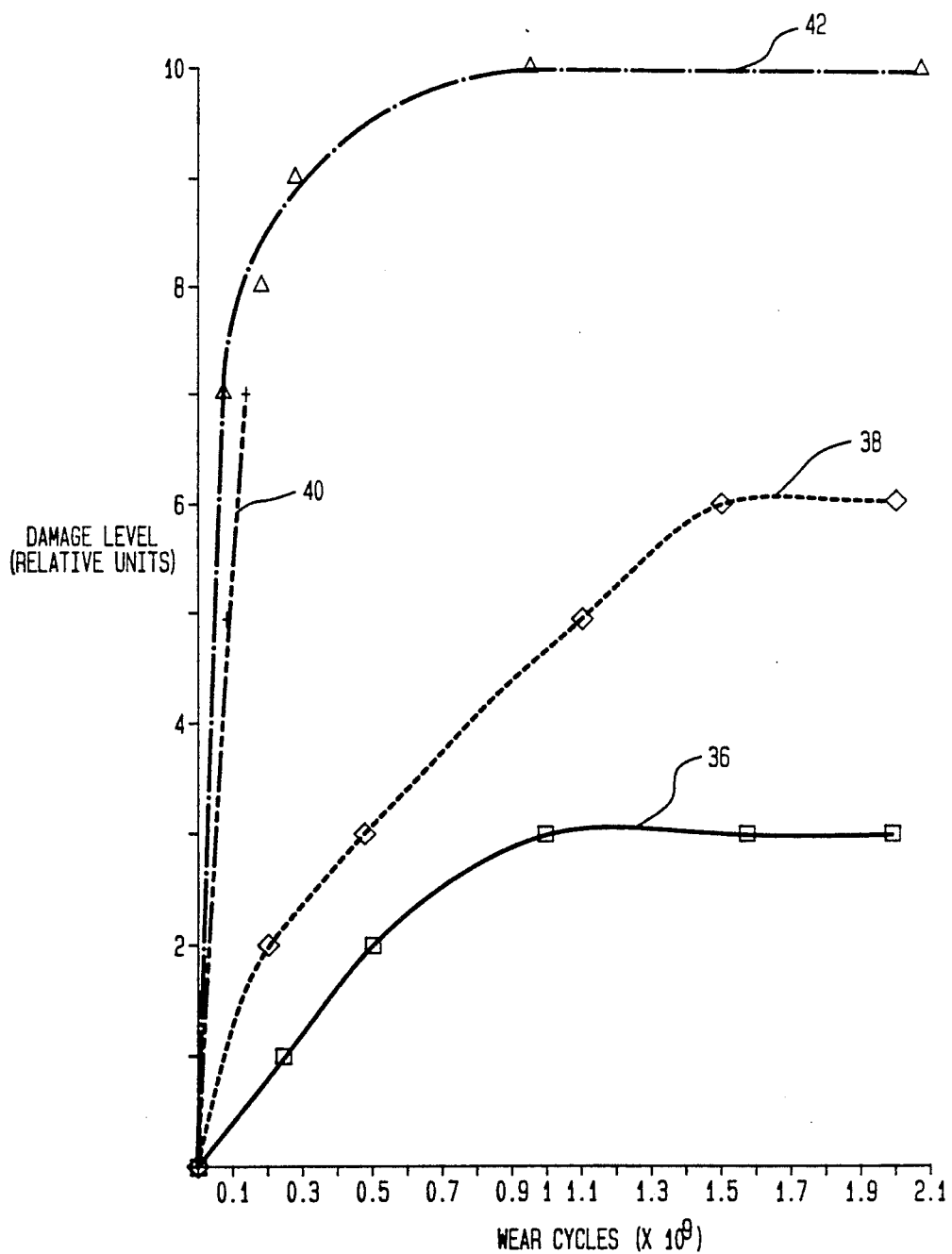

As shown in FIG. 2, by far the most significant parameter affecting the operation life of a light modulator of the planar electrode type is polarity reversal frequency, $F_r$. For example, light modulators of this type operated at a relatively high frequency, $F_r$, of 2 Hz suffered electrode damage 10 to 30 times earlier than those operated at a frequency of no greater than 1 Hz. This can be seen from FIGS. 3 and 4, which are graphs showing the results of damage to bottom and top electrodes, respectively, as a result of the number of operations of the modulators. In FIG. 3, lines 36 and 38 are for devices operated at a polarity reversal frequency significantly less than 1 Hz, and lines 40 and 42 are for devices operated at a polarity reversal frequency of 2 Hz. In FIG. 4, lines 44 and 48 are for devices operated at a polarity reversal frequency of significantly less than 1 Hz, and lines 50 and 52 are for devices operated at a polarity reversal frequency of 2 Hz. From these graphs it can be seen that it took a greater number of operating cycles before the electrodes were damaged for devices operating at a polarity reversal frequency of less than 1 Hz than for devices operating at a polarity reversal frequency of 2 Hz.

The polarity reversal frequency also affects the leakage failure of the device. Referring to FIG. 5, there is shown a graph of dynamic leakage versus operating cycles. Lines 54 and 56 are for devices operated at a polarity reversal frequency of significantly less than 1 Hz and lines 58 and 60 are for devices operated at a polarity reversal frequency of 2 Hz. It can be seen from this graph that the devices operated at the higher polarity reversal frequency had higher leakage than those operated at the lower polarity reversal frequency. Similarly, we have found that the polarity reversal frequency affects the transmission of the electro-optic material. We have found that transmission declines significantly with high polarity reversal frequency and the effect accelerates with increased operating cycles.

Thus, there is provided by the present invention an electro-optic modulator having planar electrodes on the electro-optical modulator material which is operated by reversing the polarity of an applied electric field with the polarity reversal frequency being about 1 Hz or less.

By operating the device at this low polarity reversal frequency, the operating characteristics of the device are improved. The improvements include decreasing the damage to the electrodes over a large number of operations of the device, decreasing the leakage and improving the light transmissivity of the device.

It is to be appreciated and understood that the specific embodiments of the invention are merely illustrative of the general principles of the invention. Various modifications may be made consistent with the principles set forth. For example, although PLZT is the preferred material used in an electro-optic modulator, it will be recognized by those skilled in the art that other well known electro-optic materials can be used in practicing the teachings of this invention. Also, although the electrodes are shown as being of comb-like design, they can be of any desired design. Still further, the invention applies to electro-optic modulators which are used in any type of system, not just with a microfilm apparatus. In that regard, the lens 18 of FIG. 1 may not be required if the light source 12 is of sufficient intensity.

What is claimed is:

1. An electro-optic light modulator comprising:
   a body of an electro-optic material having a pair of opposed surfaces;
   a pair of conductive electrodes on at least one of said surfaces of said body;
   means connected to said electrodes for applying a voltage thereacross; and
   means for reversing the polarity of the voltage applied to said electrodes at a frequency of about 1 Hz or less to thereby substantially eliminate drift of the voltage-transmissivity of the light modulator and reduce damage to the electrodes.

2. The light modulator of claim 1 wherein said polarity reversing means includes means for turning off said modulator in synchronism with the reversal of the polarity of the applied voltage.

3. The light modulator of claim 2 further including means for periodically cycling said modulator off and on at a relatively high frequency while the polarity of the applied voltage is fixed in a given direction and for turning said modulator on during one of the cycles as the polarity of the voltage applied to said modulator is reversed to the opposite direction.

4. An electro-optic light modulator comprising:
   a body of an electro-optic material having a pair of opposed surfaces;
   a pair of conductive electrodes on at least one of said surfaces of said body;
   means connected to said electrodes for applying a voltage thereacross; and
   means for turning off said light modulator in synchronism with reversing the polarity of the voltage applied to said electrodes at a frequency low enough to distribute electrical charges injected into said electro-optic material substantially uniformly throughout said electro-optic material and thereby substantially eliminate drift of the voltage-transmissivity of said light modulator and reduce damage to said electrodes.

5. The light modulator of claim 4 wherein said means for reversing the polarity of the voltage applied across said electrodes does so at a frequency of about 1 Hz or less.

6. The light modulator of claim 5 further including means for periodically cycling said modulator off and on at a relatively high frequency while the Polarity of the applied voltage is fixed in a given direction and for turning said modulator on during one of the cycles as the polarity of the voltage applied to said modulator is reversed to the opposite direction.

7. A method of operating an electro-optic light modulator of the type comprising a body of an electro-optic material having opposed surfaces and a pair of conductive electrodes on at least one of said surfaces, said method comprising the steps of:
   applying a voltage between said electrodes; and
   turning said modulator off in synchronism with reversing the polarity of the voltage applied to said electrodes at a frequency of about 1 Hz or less.

8. The method of claim 7 further including the steps of:
   (i) periodically turning said modulator off and on at a relatively high frequency while the polarity of the applied voltage is fixed in a given direction, and
   (ii) turning said modulator on during one of the cycles as the polarity of the voltage applied to said modulator is reversed to the opposite direction.

9. A method of operating an electro-optic light modulator which comprises a body of an electro-optic material having opposed surfaces and a pair of conductive electrodes on at least one of said surfaces, said method comprising the steps of:
   applying a voltage between said electrodes; and
   reversing the polarity of the voltage, in synchronism with turning said modulator off, at a frequency low enough to distribute electrical charges injected into the electro-optic material substantially uniformly throughout the electro-optic material and thereby substantially eliminate drift of the voltage-transmissivity of the light modulator and reduce damage to the electrodes.

10. The method of claim 9 in which the frequency of the reversal of the voltage is about 1 Hz or less.

* * * * *